US011306780B1

(12) United States Patent
Adler et al.

(10) Patent No.: US 11,306,780 B1
(45) Date of Patent: Apr. 19, 2022

(54) BEARING ASSEMBLY WITH LUBRICANT RETAINERS

(71) Applicant: AKTIEBOLAGET SKF, Gothenburg (SE)

(72) Inventors: Jonathan Adler, Bloomfield Hills, MI (US); Luigi Mastrofrancesco, Novi, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/189,695

(22) Filed: Mar. 2, 2021

(51) Int. Cl.
*F16C 19/06* (2006.01)
*F16C 33/66* (2006.01)

(52) U.S. Cl.
CPC .......... *F16C 33/6651* (2013.01); *F16C 19/06* (2013.01)

(58) Field of Classification Search
CPC .. F16C 19/06; F16C 33/6614; F16C 33/6651; F16C 33/7846; F16C 33/785
See application file for complete search history.

(56) References Cited

U.S. PATENT DOCUMENTS

| | | | | |
|---|---|---|---|---|
| 1,722,490 A * | 7/1929 | Bott | ...................... | F16C 33/785 384/480 |
| 1,917,988 A * | 7/1933 | Large | .................... | F16C 33/785 384/487 |
| 2,902,300 A * | 9/1959 | Schultz | ................. | F16C 33/785 277/411 |
| 5,575,569 A * | 11/1996 | Shinohara | ........... | F16C 33/6614 384/470 |
| 5,749,660 A * | 5/1998 | Dusserre-Telmon | ....................... | F16C 19/166 384/475 |
| 9,194,433 B2 * | 11/2015 | Qiu | ..................... | F16C 33/7846 |
| 10,197,092 B2 * | 2/2019 | Kanamoto | .......... | F16C 33/6633 |
| 2011/0255999 A1 * | 10/2011 | Adamietz | ............. | F16C 33/782 417/65 |

FOREIGN PATENT DOCUMENTS

JP          2011256914 A  * 12/2011  .......... F16C 33/6674

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A bearing assembly includes inner and outer rings, a plurality of rolling elements between the rings and first and second lubricant retainers. Each one of the first and second retainers includes an annular body having an outer radial end coupled with the outer ring and an inner radial end spaced radially and/or axially outwardly from the inner bearing ring such that an annular gap is defined between the inner radial end of each retainer and the bearing inner ring. The first retainer is disposed at least generally adjacent to a first axial end of the outer ring and the second retainer is disposed at least generally adjacent to a second axial end of the outer ring. The first and second retainers retain a quantity of liquid lubricant within the bearing annular space and the annular gap is sized to permit lubricant to be directed into the bearing annular space.

18 Claims, 15 Drawing Sheets

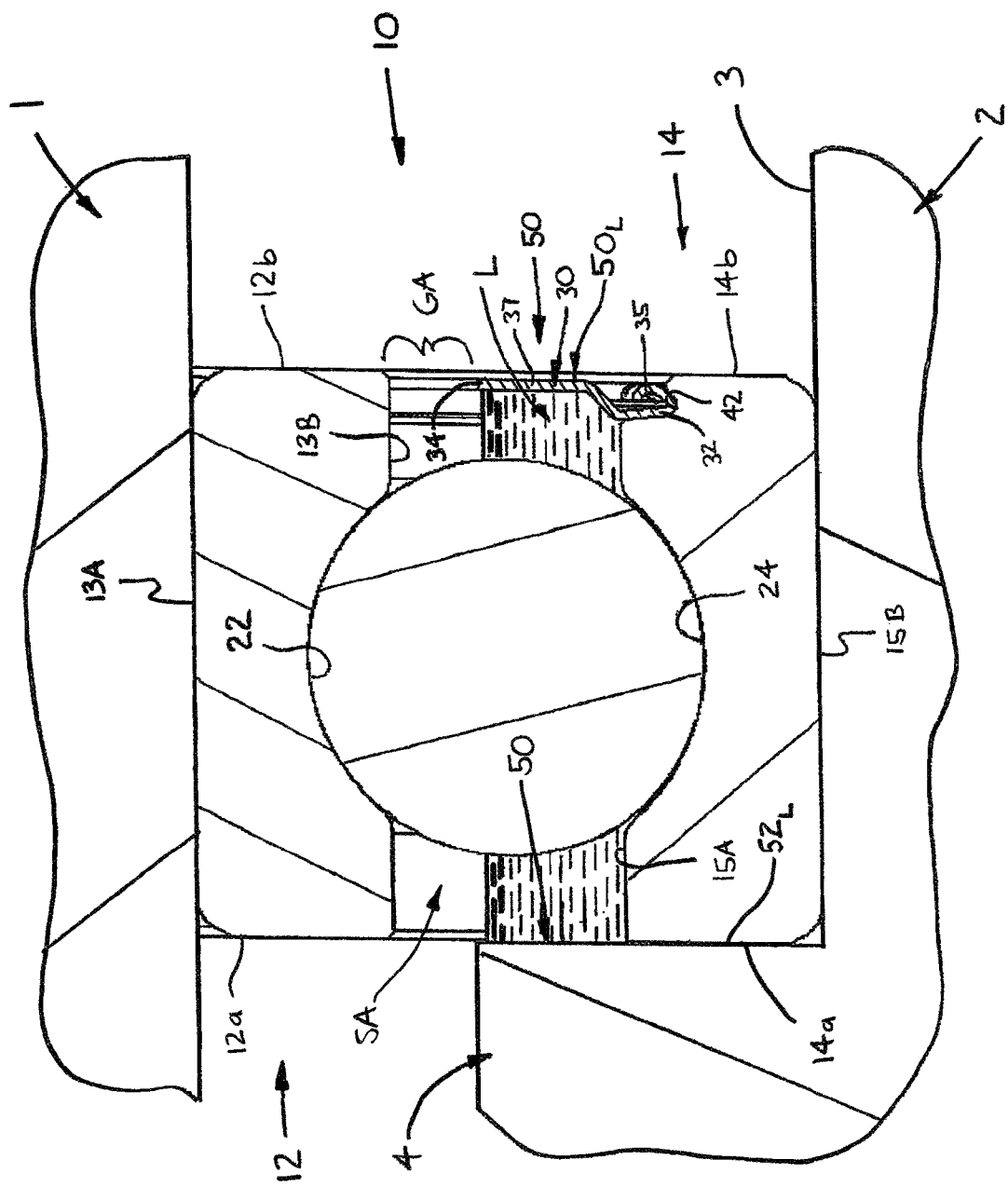

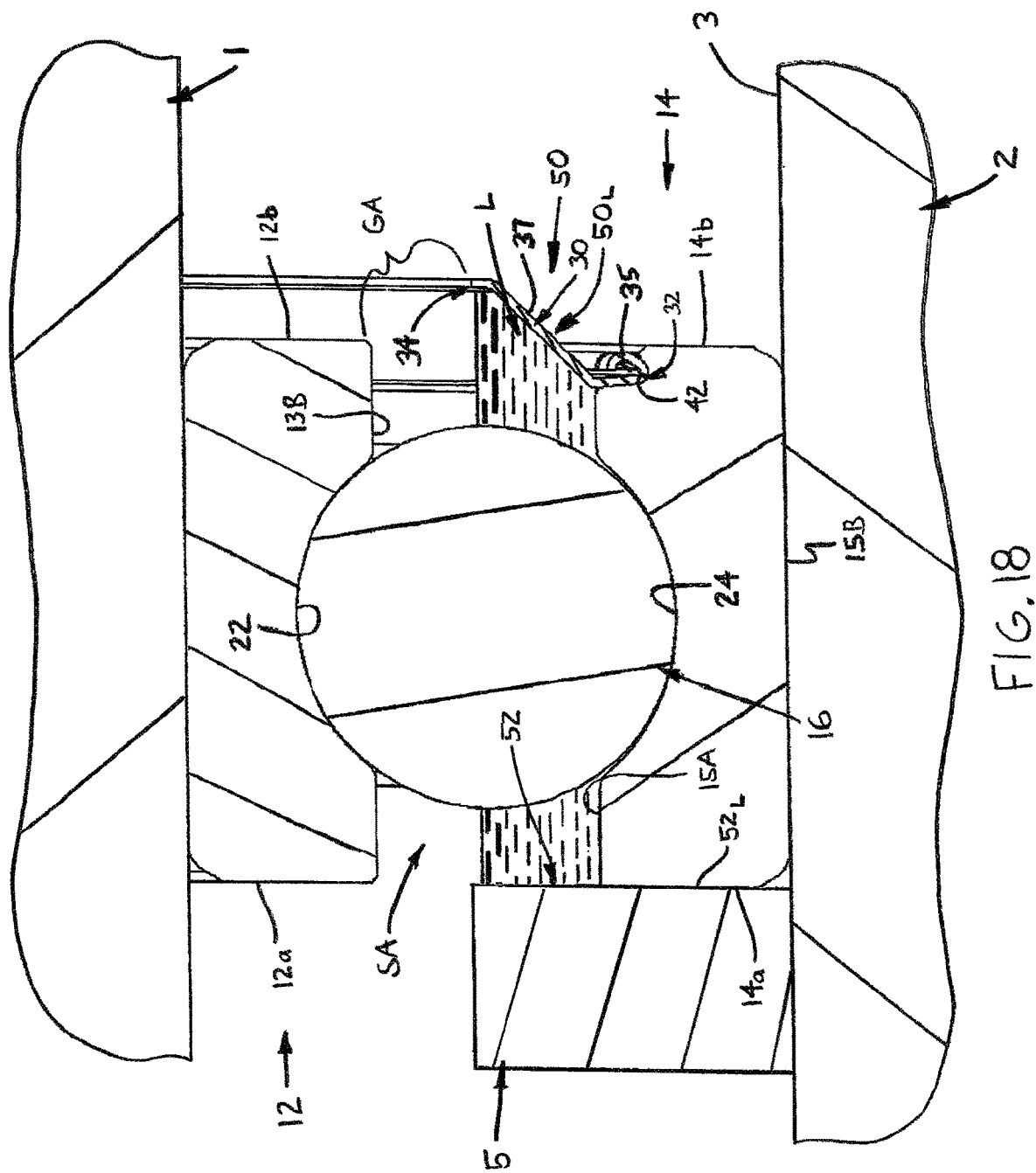

BEARING ASSEMBLY WITH LUBRICANT RETAINERS

BACKGROUND OF THE INVENTION

The present invention relates to bearings, and more particularly to oil-lubricated rolling element bearings.

Rolling element bearings typically include inner and outer rings and a plurality of rolling elements (e.g., balls, cylinders, needles, etc.) disposed between and rolling on each of the inner and outer rings. To reduce friction and prevent potential damage to the rings and/or rolling elements, lubricant must be provided within the annular space between the rings. In certain applications, particularly in grease lubricated bearings, the grease is sealed within the inner space or/and may be replenished by means of grease passages extending through the outer ring.

However, particularly with oil lubricated bearings, the oil must be provided from an exterior source, such as being sprayed into the annular space from a lubrication device or supplied by a "forced flow" of lubricant through the bearing. With such oil-lubricated bearings, there is typically a lag from an initial start-up of the machine or device incorporating the bearing until oil is provided into the bearing. Such a lack of lubricant during start-up may lead to excessive wear or damage to the bearing.

SUMMARY OF THE INVENTION

In one aspect, the present invention is a bearing assembly comprising an inner ring having inner and outer circumferential surfaces and opposing axial ends, the outer circumferential surface providing a bearing inner race. An outer ring is disposed about the inner ring so as to define a bearing annular space, the outer ring having inner and outer circumferential surfaces and opposing, first and second axial ends, the inner circumferential surface providing a bearing outer race spaced radially outwardly from the bearing inner race. One of the bearing inner and outer rings is rotatable with respect to the other one of the bearing inner and outer rings about a central axis. A plurality of rolling elements are disposed between the inner and outer rings so as to roll simultaneously upon the inner and outer races. Further, the bearing assembly also comprises first and second lubricant retainers, each one of the first and second retainers including an annular body having an outer radial end coupled with the outer ring and an inner radial end spaced radially and/or axially outwardly from the inner bearing ring such that an annular gap is defined between the inner radial end of each retainer and the bearing inner ring. The first retainer is disposed at least generally adjacent to the first axial end of the outer ring and the second retainer is disposed at least generally adjacent to the second axial end of the outer ring. The first and second retainers are configured to retain a quantity of liquid lubricant within the bearing annular space.

In another aspect, the present invention is again a bearing assembly as described in the previous paragraph and in which the annular gap between the inner radial end of each retainer and the bearing inner ring is sized to permit lubricant to be directed into the bearing annular space and further in which the first and second lubricant retainers are configured such that lowermost portions of the first and second retainers retain the quantity of lubricant within the bearing annular space when both of the inner and outer rings are non-rotatable about the central axis.

In a further aspect, the present invention is again a bearing assembly including inner and outer rings and rolling elements as described above. The bearing assembly further comprises a radial barrier surface located adjacent to the first axial end of the outer ring, extending circumferentially about the central axis and extending radially inwardly from the inner surface of the outer ring and toward the outer surface of the inner ring. A lubricant retainer is disposed at least generally adjacent to the second axial end of the outer ring and includes an annular body having an outer radial end coupled with the outer ring and an inner radial end spaced radially outwardly or/and axially outwardly from the inner bearing ring such that an annular gap is defined between the inner radial end of the retainer and the bearing inner ring. The retainer and the barrier surface are configured to retain a quantity of liquid lubricant within the bearing annular space.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 17 is a broken-away, axial cross-sectional view of a lower portion of an alternative bearing assembly including a barrier surface provided by a shoulder and a single lubricant retainer formed as a first construction retainer; and FIG. 18 is another broken-away, axial cross-sectional view of a lower portion of the alternative bearing assembly including a barrier surface provided by a ring and a single lubricant retainer formed as a second construction retainer.

DETAILED DESCRIPTION OF THE INVENTION

Figure 1:
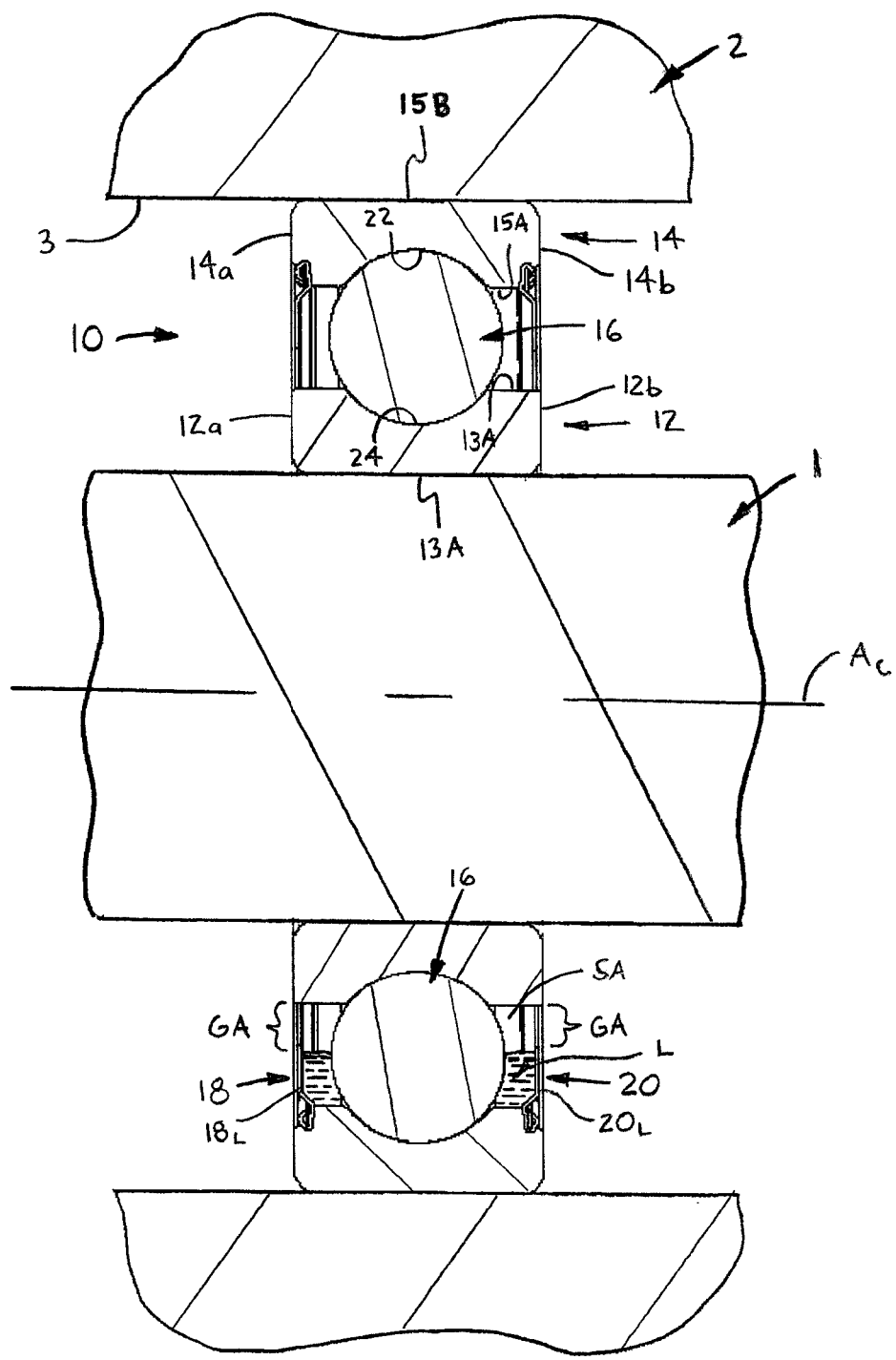
FIG. 1 is an axial cross-sectional view of a bearing assembly having lubricant retainers formed in a first construction, the bearing assembly being mounted on a shaft and within an outer member.
Figure 2:
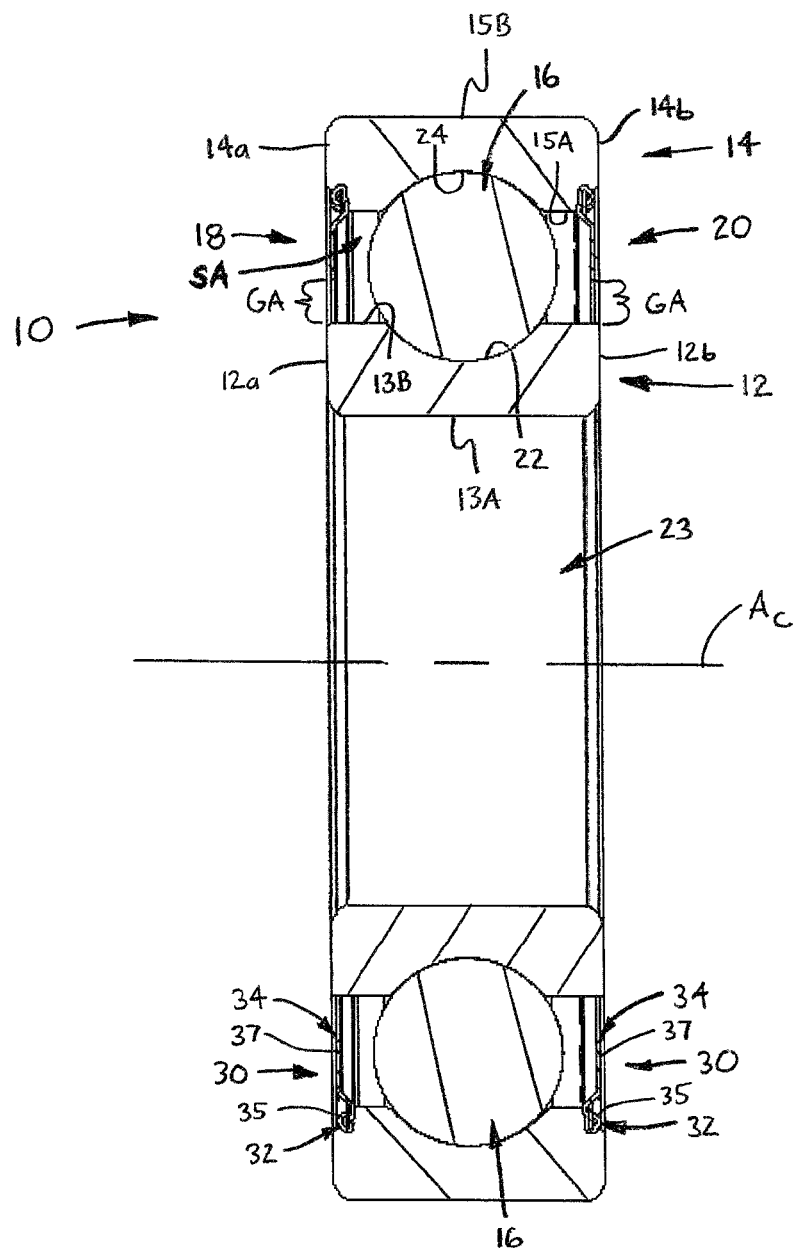
FIG. 2 is another axial cross-sectional view of the bearing assembly of FIG. 1, shown separate from the shaft and outer member.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-18 a bearing assembly 10 basically comprising an inner ring 12, an outer ring 14 disposed about the inner ring 12 so as to define an annular space SA, a plurality of rolling elements 16 disposed between the inner and outer rings 12, 14, and first and second lubricant retainers 18, 20, respectively, configured to retain liquid lubricant L (e.g., oil) within the bearing annular space SA. More specifically, the inner ring 12 has inner and outer circumferential surfaces 13A, 13B and opposing axial ends 12a, 12b, the outer circumferential surface 13B providing a bearing inner race 22 and the inner surface 13A defines a bore 23 for receiving a shaft 1. The outer ring 14 has inner and outer circumferential surfaces 15A, 15B, respectively, and opposing, first and second axial ends 14a, 14b, respectively, and is spaced from the bearing inner ring 12 by a radial spacing distance $D_{RS}$, as discussed below.

Further, the inner circumferential surface 15A of the outer ring 14 provides a bearing outer race 24 spaced radially outwardly from the bearing inner race 22 and the outer surface 15B is engageable, preferably frictionally, with the bore 3 of a radially-outer member 2, such as a housing, a hub or similar component. One of the bearing inner and outer rings 12, 14 is rotatable with respect to the other one of the bearing inner and outer rings 12, 14 about a central axis $A_C$. For example, the bearing inner ring 12 rotates within the outer ring 14 when mounted to a rotatable shaft 1 and the outer ring 14 rotates about the inner ring 12 when mounted within a rotatable hub, etc. Also, the plurality of rolling elements 16 roll simultaneously upon the inner and outer races 22, 24 and the liquid lubricant L (e.g., oil) serves to reduce friction between the rolling elements 16 and the races 22, 24. Preferably, each rolling element 16 is a spherical roller or "ball", but may alternatively be a cylinder, a needle or any other appropriate type of rolling element.

Figure 6:
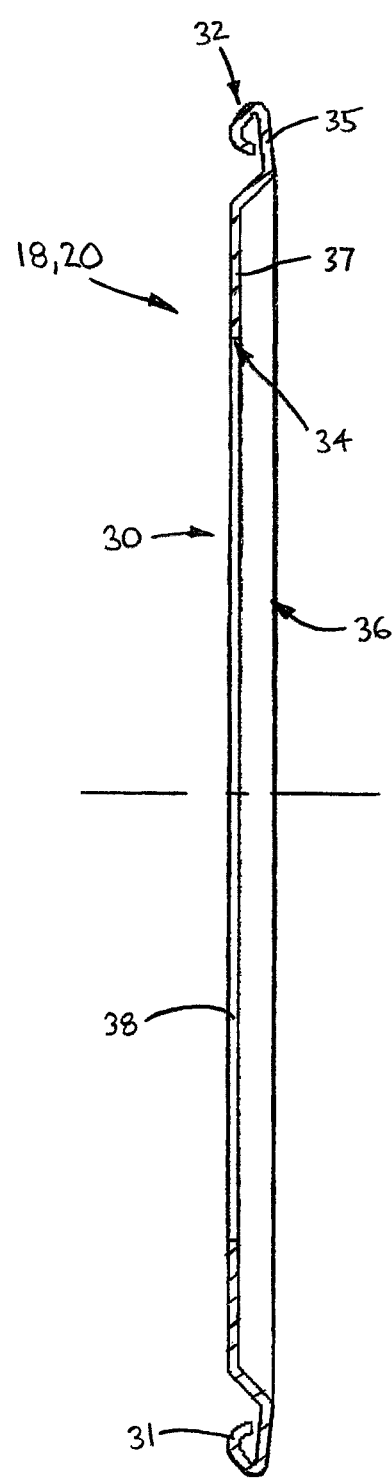
FIG. 6 is an axial cross-sectional view of the first construction lubricant retainer.
Figure 7:
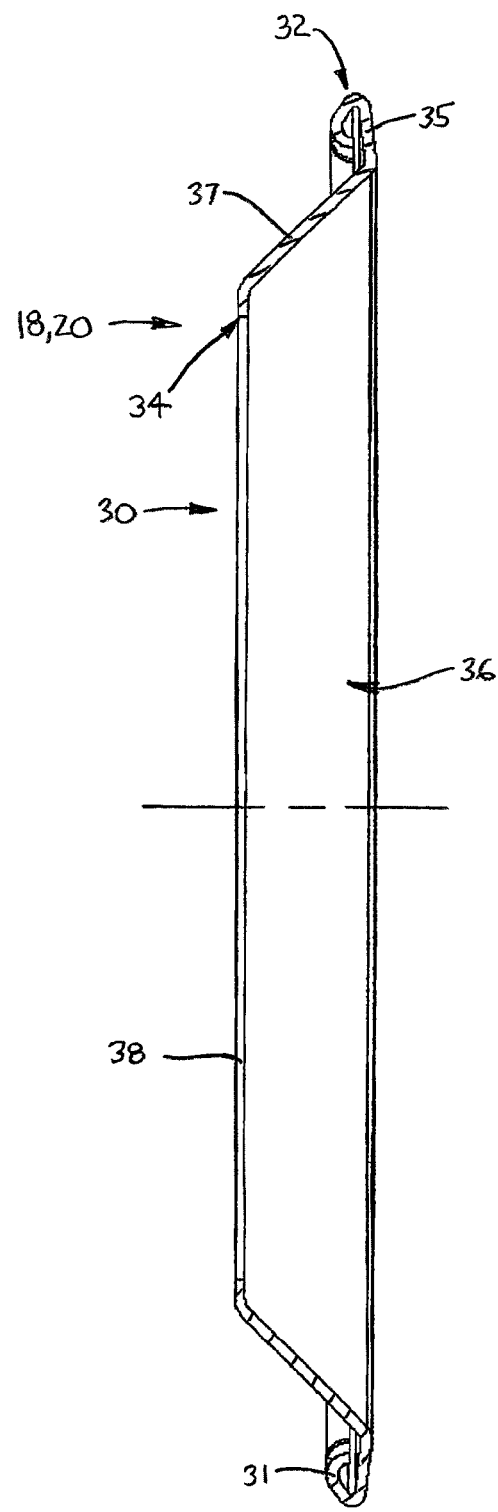
FIG. 7 is an axial cross-sectional view of a second construction lubricant retainer.
Figure 8:
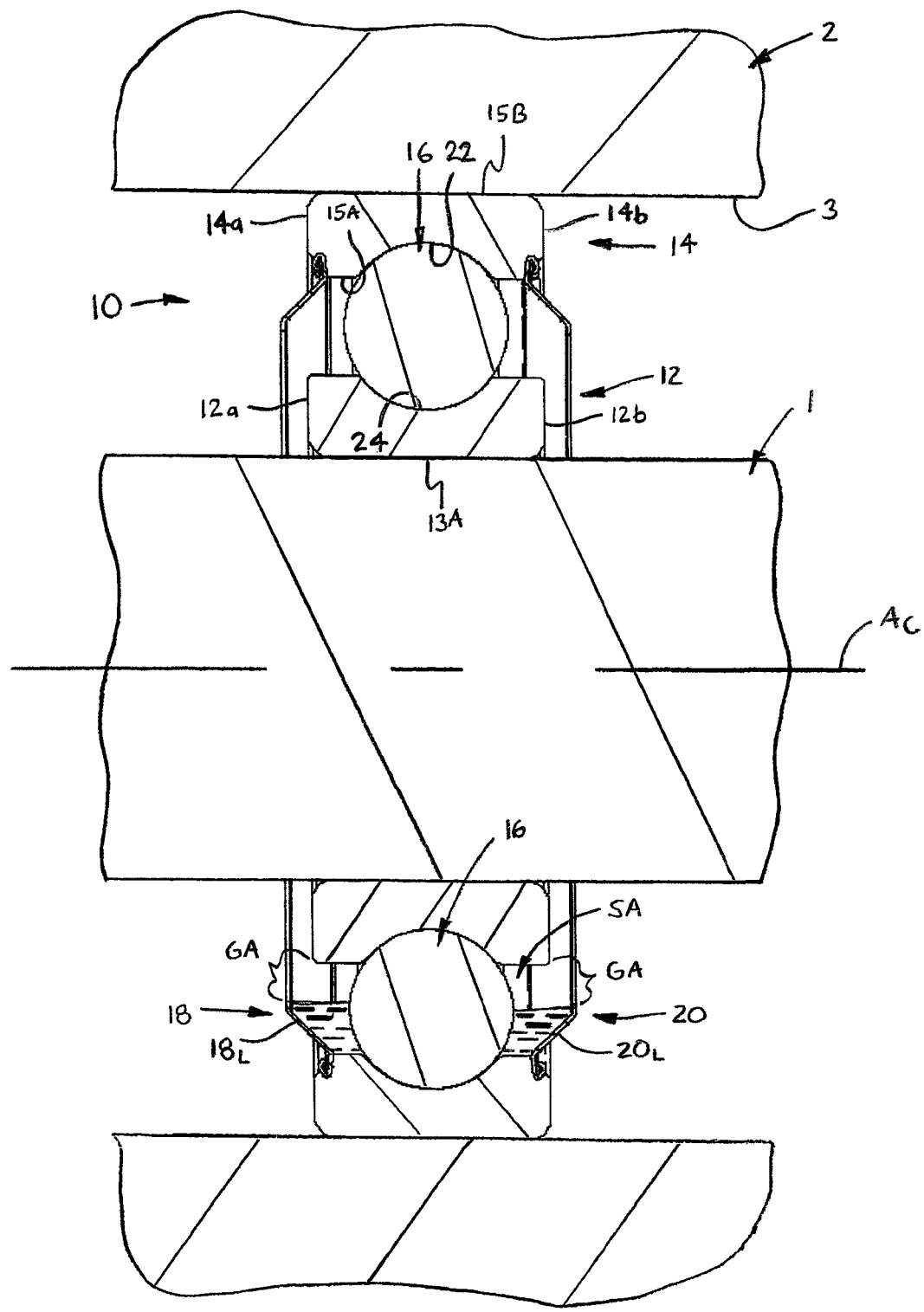
FIG. 8 is an axial cross-sectional view of a bearing assembly having the second construction lubricant retainers, the bearing assembly being mounted on a shaft and within an outer member.
Figure 9:
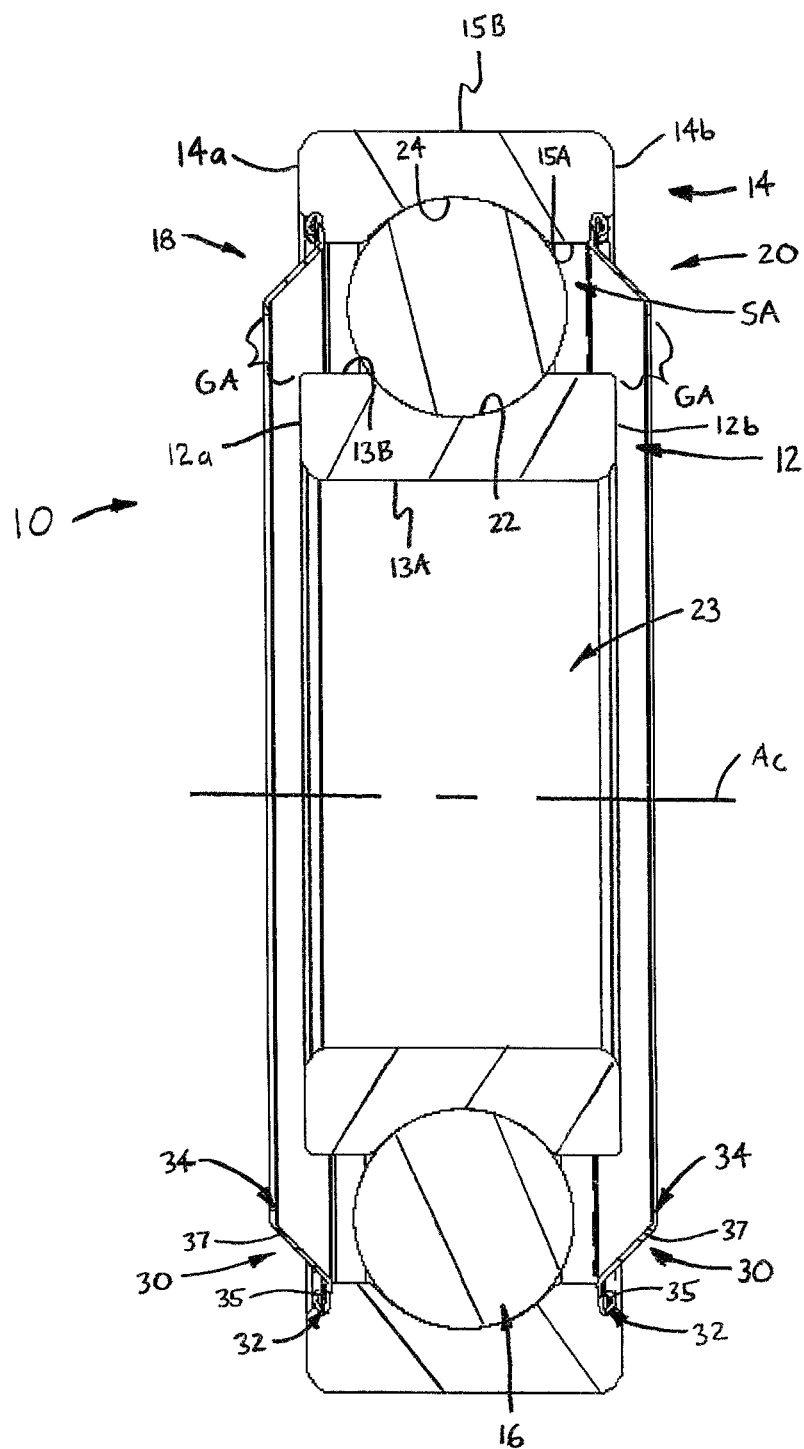
FIG. 9 is another axial cross-sectional view of the bearing assembly of FIG. 8, shown separate from the shaft and outer member.

Furthermore, each one of the first and second retainers 18, 20 includes an annular body 30 having an outer radial end 32 coupled with the outer ring 14 and an inner radial end 34. The inner radial end 34 is spaced radially outwardly from, and/or axially outwardly from, the inner bearing ring 12 such that an annular gap GA is defined between the inner radial end 34 of each retainer 18, 20 and the bearing inner ring 12. As best shown in FIGS. 6 and 7, the body 30 of each retainer 18 or 20 preferably includes or is formed as a relatively thin, circular plate 36 having a central opening 38 defining the radial inner end 34 of the retainer 18 or 20, the plate 36 being generally flat or frustoconical, as discussed below. Preferably, each one of the first and second lubricant retainers 18, 20 includes a radially-outer engagement portion 35 and a radially-inner barrier portion 37. The engagement portion 35 provides the retainer outer radial end 34 and is configured to couple the retainer 18 or 20 with the bearing outer ring 14 and the barrier portion 37 provides the retainer inner radial end 36 and is configured to retain liquid lubricant L within the bearing inner space SA.

As shown in FIGS. 1-5 and 8-16, the first retainer 18 is disposed at least generally adjacent to the first axial end 14a of the outer ring 14 and the second retainer 20 is disposed at least generally adjacent to the second axial end 14b of the outer ring 14. As discussed above, the first and second retainers 18, 20 are configured to retain a quantity of liquid lubricant L within the bearing annular space SA. Specifically, the first and second lubricant retainers 18, 20 are configured such that lowermost portions 18L, 20L of the first and second retainers 18, 20 retain the quantity of lubricant L within the bearing annular space SA when both of the inner and outer rings 12, 14 are non-rotatable about the central axis Ac, as depicted in FIGS. 1, 4, 8 and 11. That is, those retainer portions 18L, 20L that are vertically lowest during a specific operation phase or stage in which the particular machine or device (none shown) which incorporate the bearing assembly 10 is non-functioning or stopped, such that both rings 12, 14 and rolling elements 16 are temporarily static, function to trap or retain a "pool" of lubricant within the annular space SA; i.e., lubricant L in the bearing assembly 10 drains downwardly due to gravity so as to be located between the lower portions 18L, 20L. As any portion of the retainers 18, 20 may be located at the vertically lowermost position during the life of the bearing assembly 10, the entire circumferential perimeter of each annular retainer 18, 20 must be capable of retaining liquid lubricant within the bearing annular space SA.

The purpose for retaining lubricant L within the annular space SA during an operational stoppage is to meet at least a portion of the required lubrication needs of the bearing assembly 10 during a subsequent start-up or restart of the machine/device after an idle period and prior to external sources of lubricant (none shown) being capable of supplying lubricant to the bearing assembly 10. Without such a quantity of retained lubricant L, damage to the races or rolling elements, such a scoring, galling, spalling, etc. may occur. Also, the above-mentioned annular gap GA is sized to permit lubricant to be delivered into the bearing annular space SA from the external source to the bearing assembly 10. Such lubricant source(s) may provide a forced flow of lubricant through the bearing assembly 10 or may just provide a spray of lubricant into the annular space SA. In any case, the first and second lubricant retainers 18, 20 must be formed to both retain a sufficient quantity of lubricant L for initial start-up and to provide a gap GA that permits sufficient lubricant flow into the bearing assembly 10 from an external source(s) during normal operation.

Referring now to FIGS. 3-5 and 10-12, the outer ring 14 is preferably provided with first and second annular grooves 40, 42 for coupling the first and second retainers 18, 20 with the outer ring 14. More specifically, the first annular groove 40 extends radially outwardly from the inner circumferential surface 15A of the outer ring 14 and is located adjacent to the first axial end 14a of the outer ring 14 and the second annular groove 42 also extends radially outwardly from the inner circumferential surface 15A and is located adjacent to the second axial end 14b of the outer ring 14. With this structure, the outer radial end 32 of the first retainer 18 is disposed within the first annular groove 40 and the outer radial end 32 of the second lubricant retainer 20 is disposed within the second annular groove 42.

Figure 3:
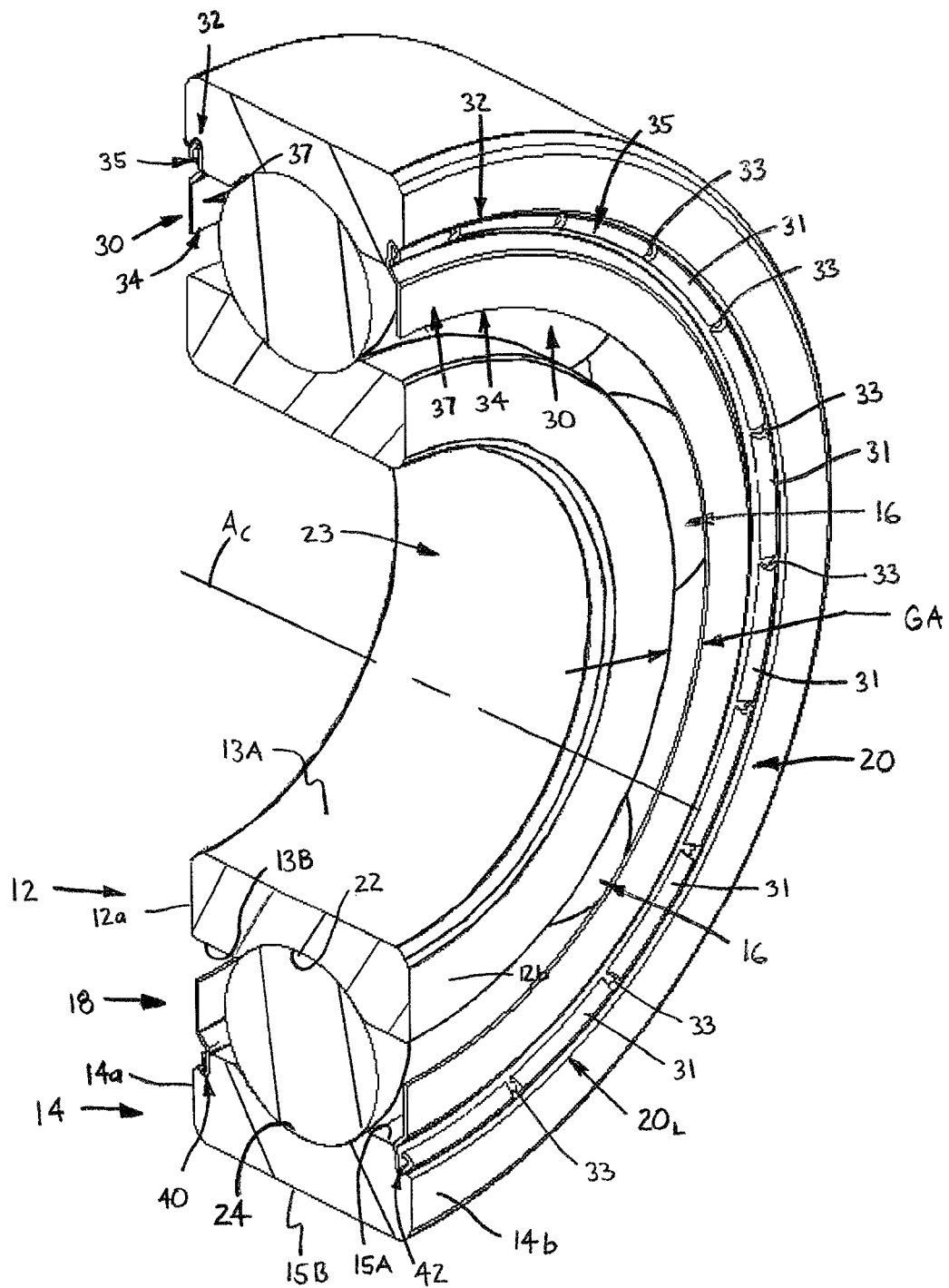
FIG. 3 is a broken-away, perspective view of the bearing assembly of FIG. 2.
Figure 4:
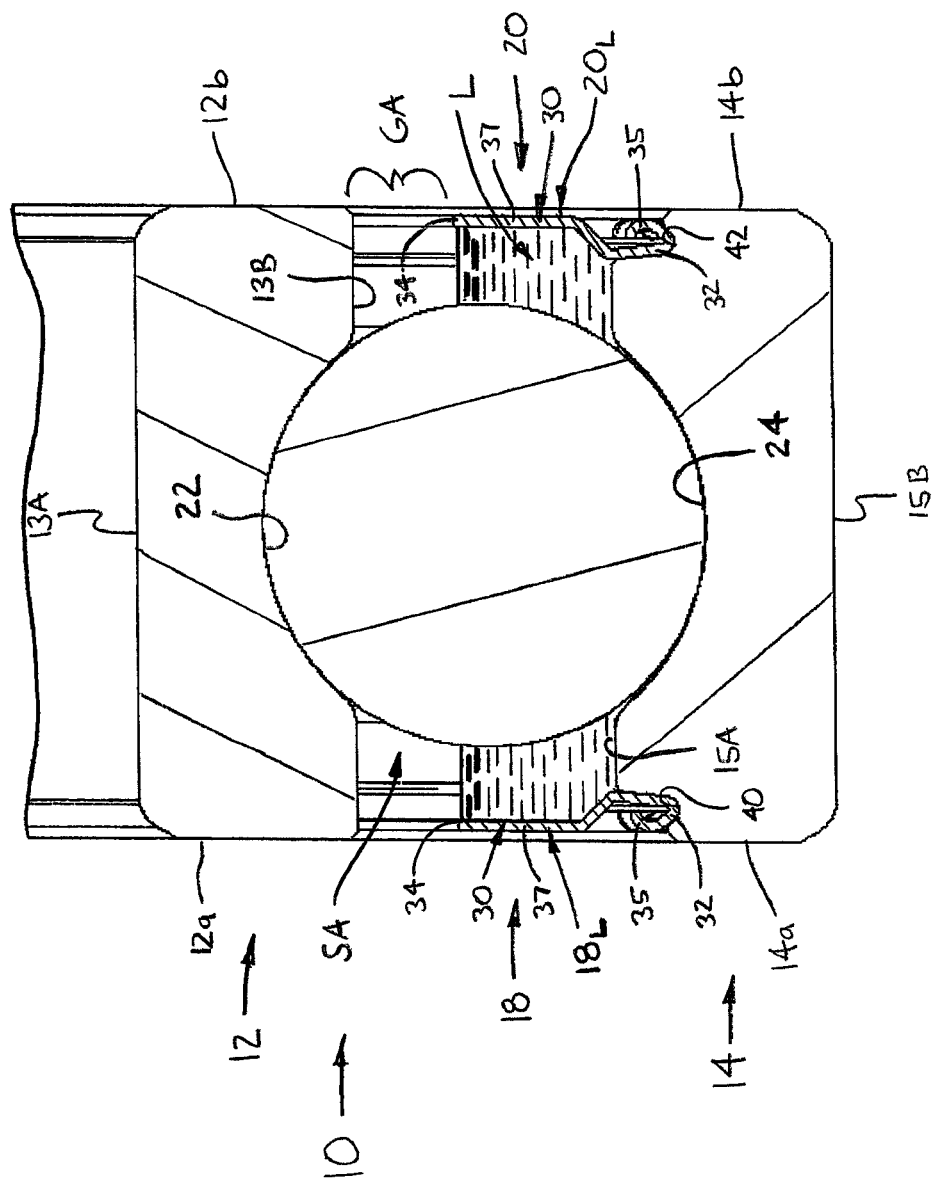
FIG. 4 is a broken-away, axial cross-sectional view of a lower portion of FIG. 2, showing a quantity of retained lubricant.
Figure 10:
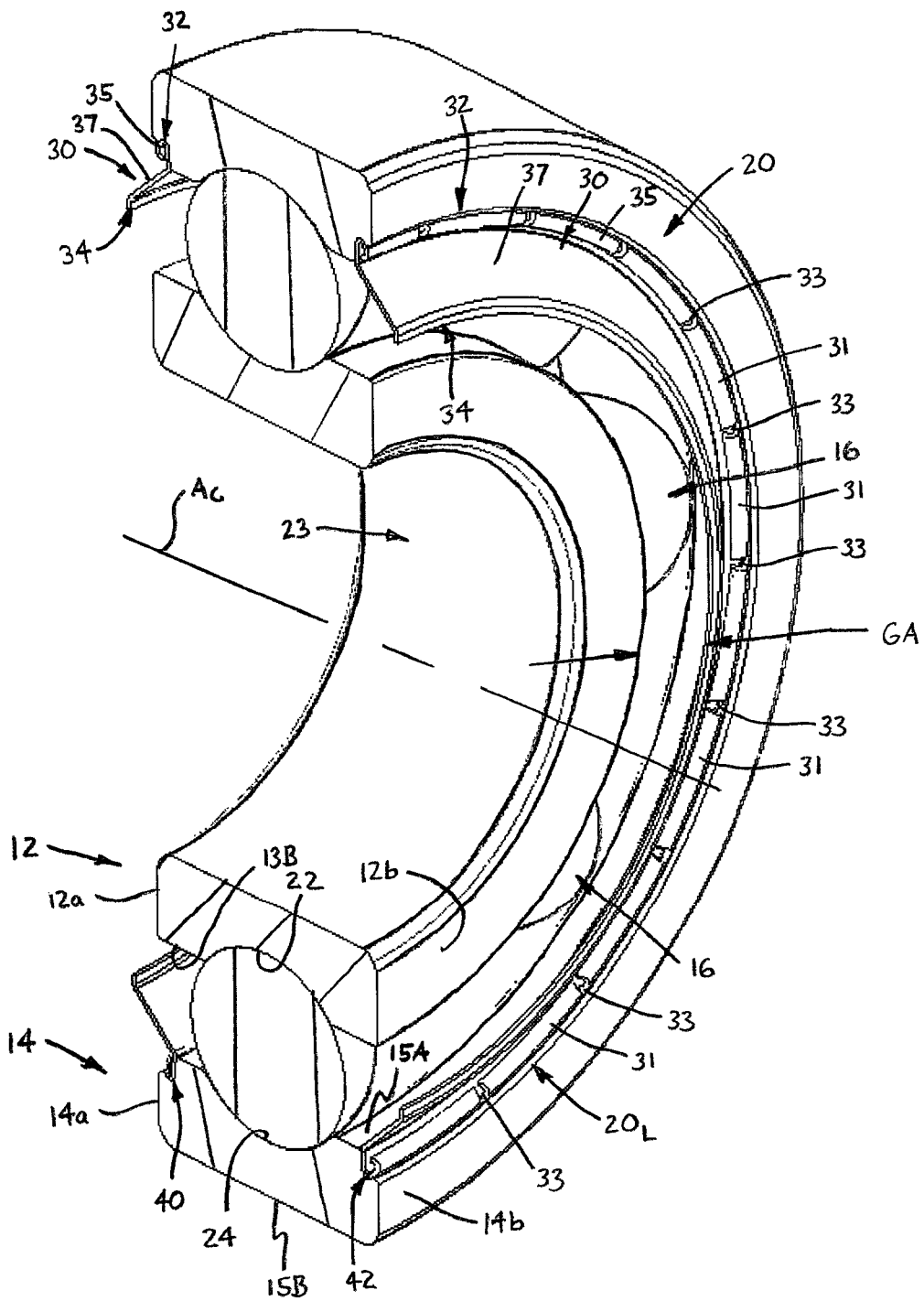
FIG. 10 is a broken-away, perspective view of the bearing assembly of FIG. 9.
Figure 11:
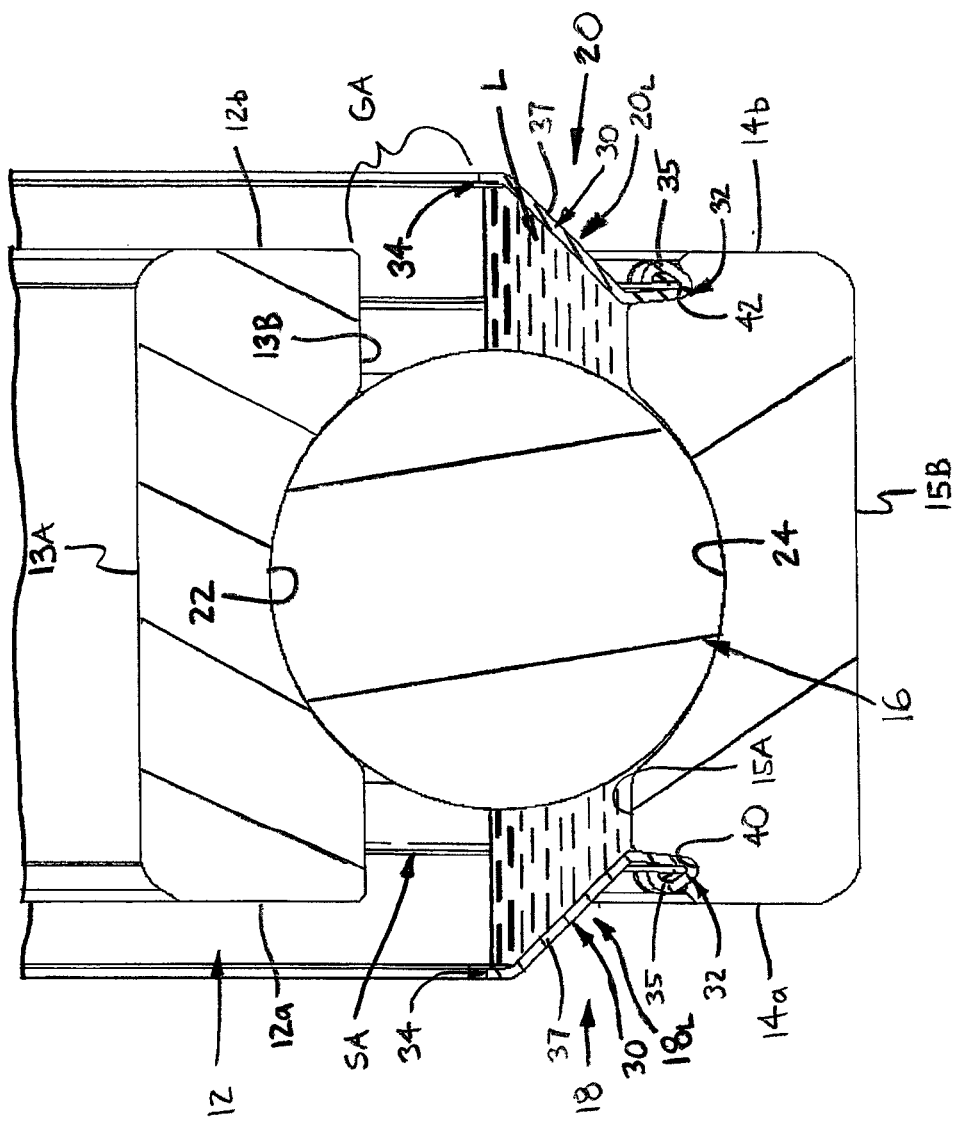
FIG. 11 is a broken-away, axial cross-sectional view of a lower portion of FIG. 9, showing a quantity of retained lubricant.
Figure 12:
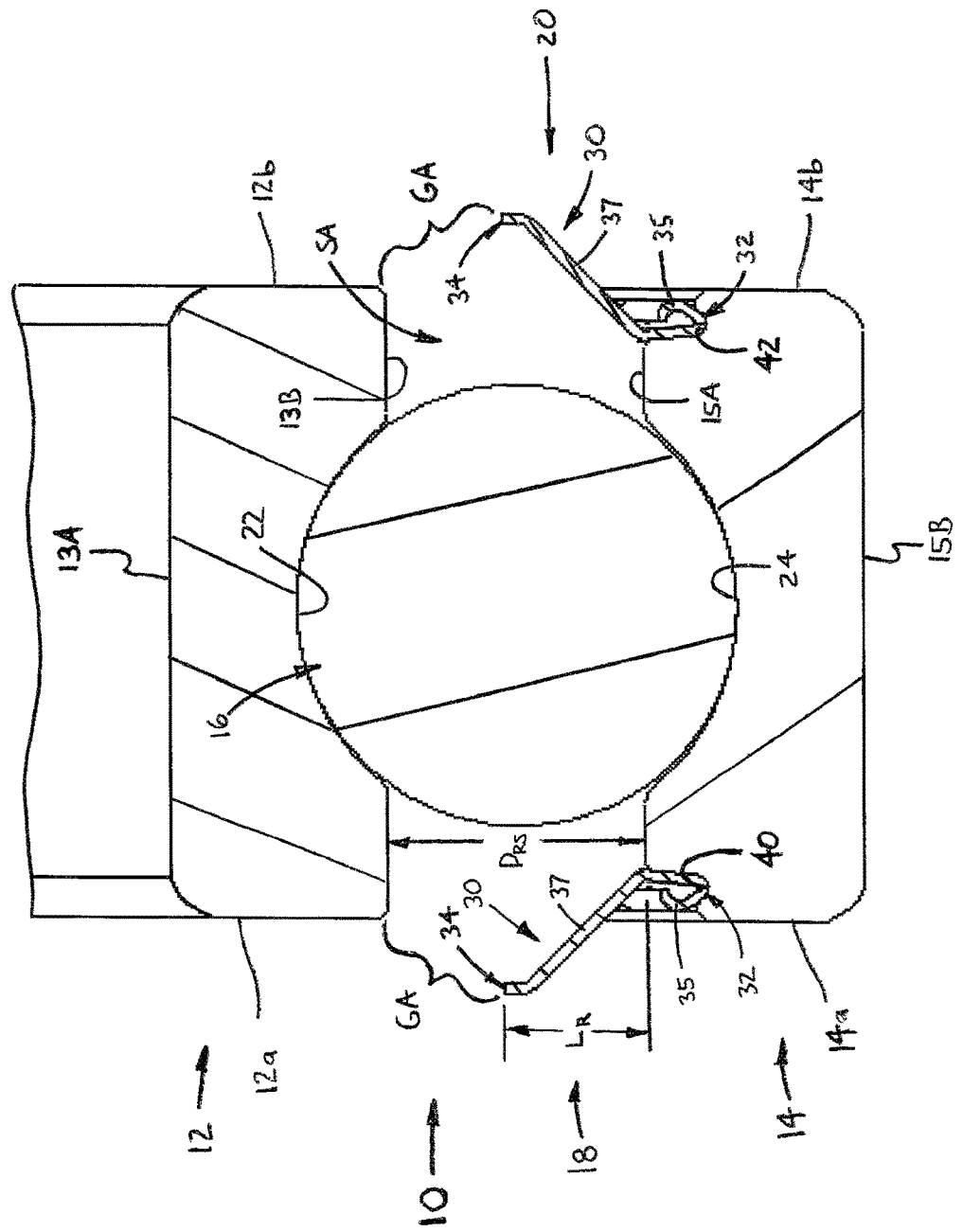
FIG. 12 is another, more simplified view of FIG. 11, shown without lubricant.
Figure 13:
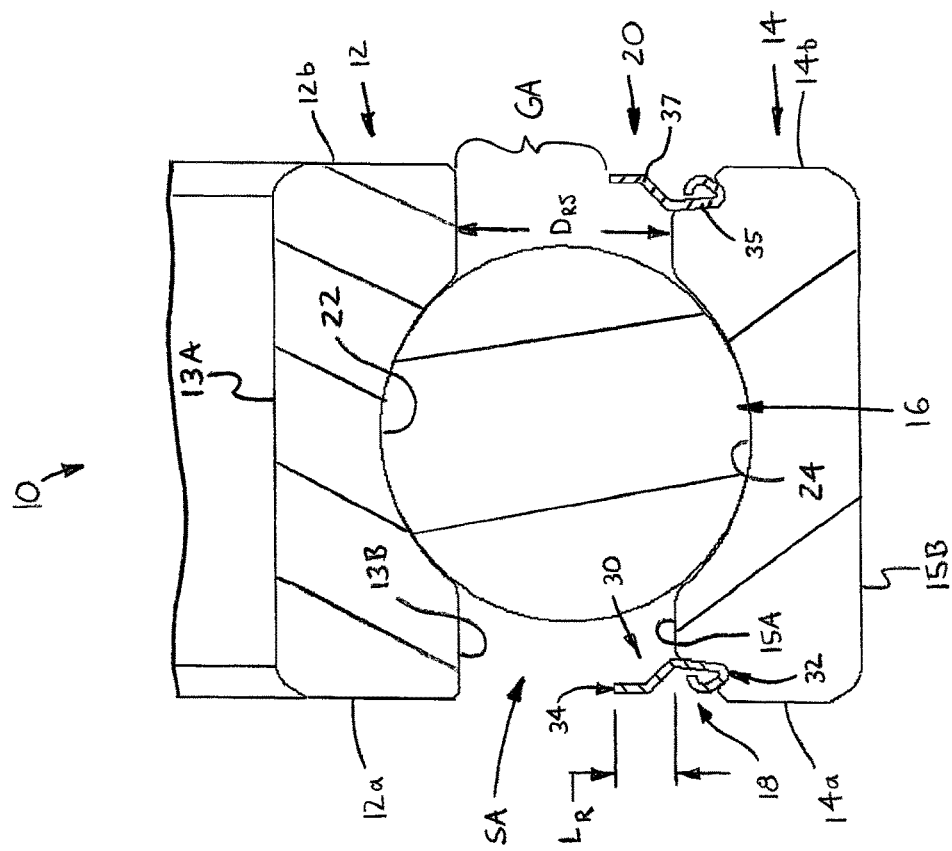
FIG. 13 is a broken-away, axial cross-sectional view of the bearing assembly, showing lubricant retainers having a radial length of about fifteen percent of a radial spacing distance between the bearing inner and outer rings.
Figure 14:
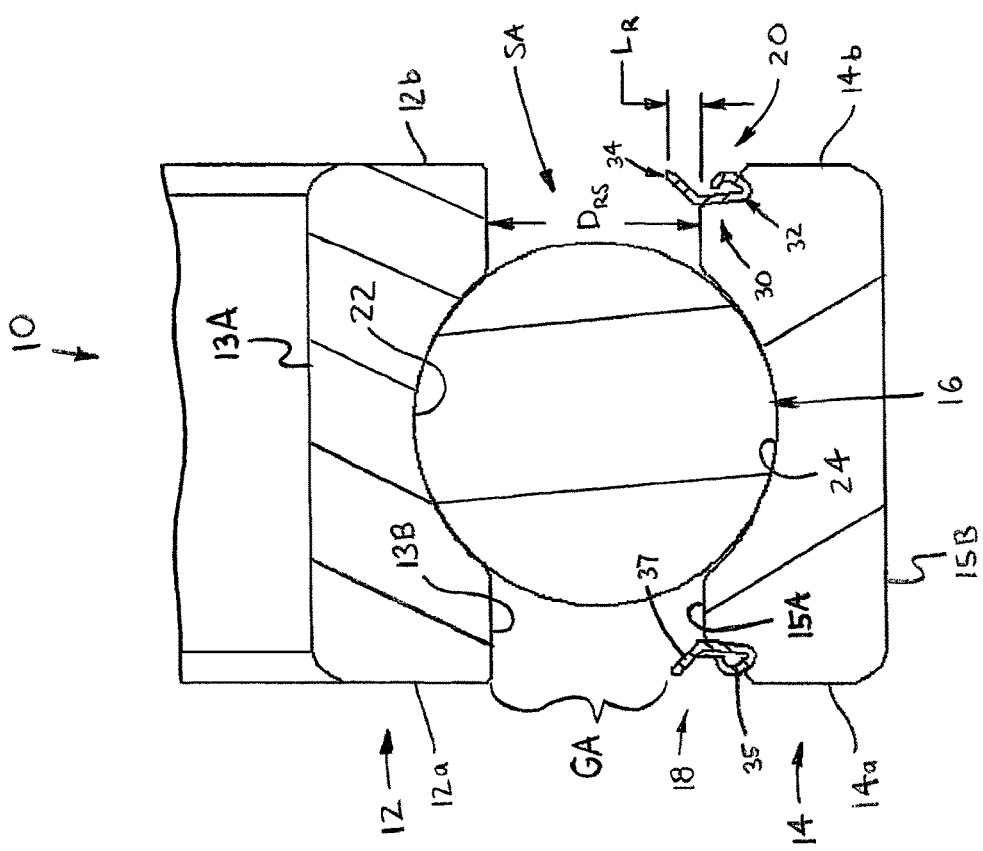
FIG. 14 is another a broken-away, axial cross-sectional view of the bearing assembly, showing first construction lubricant retainers having a radial length of about thirty percent of the radial spacing distance.
Figure 16:
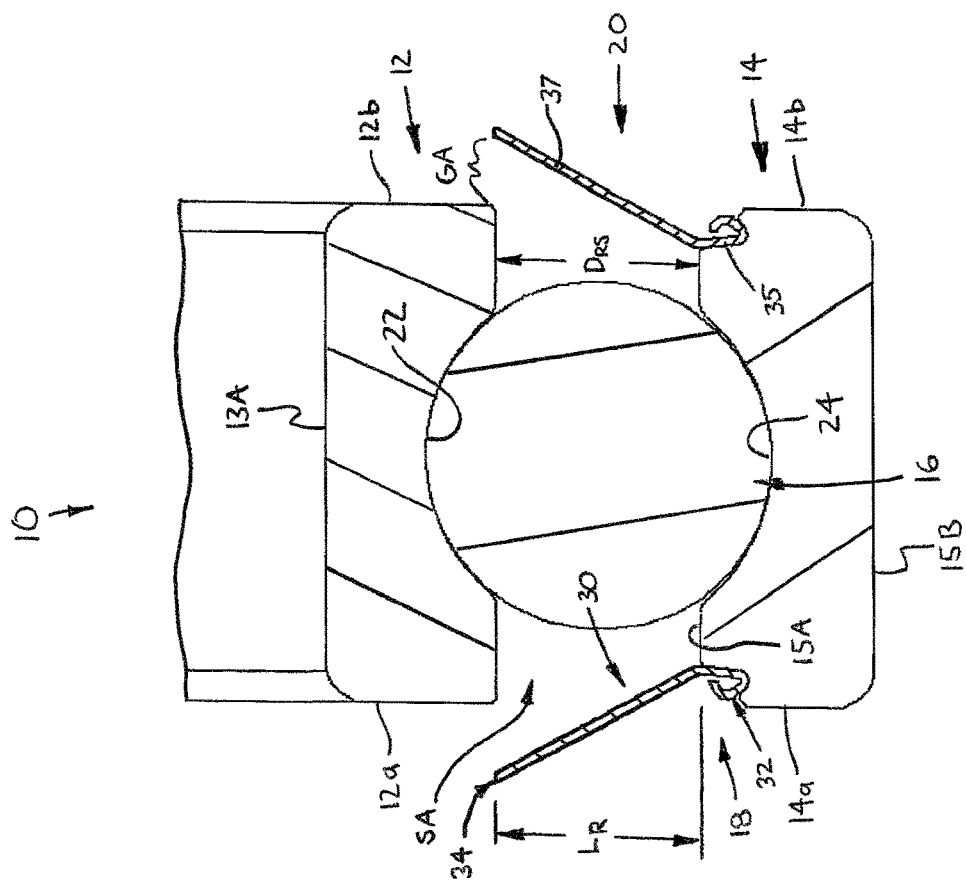
FIG. 16 is a further broken-away, axial cross-sectional view of the bearing assembly, showing second construction lubricant retainers formed to extend radially inwardly of the inner ring outer circumferential surface.
Figure 15:
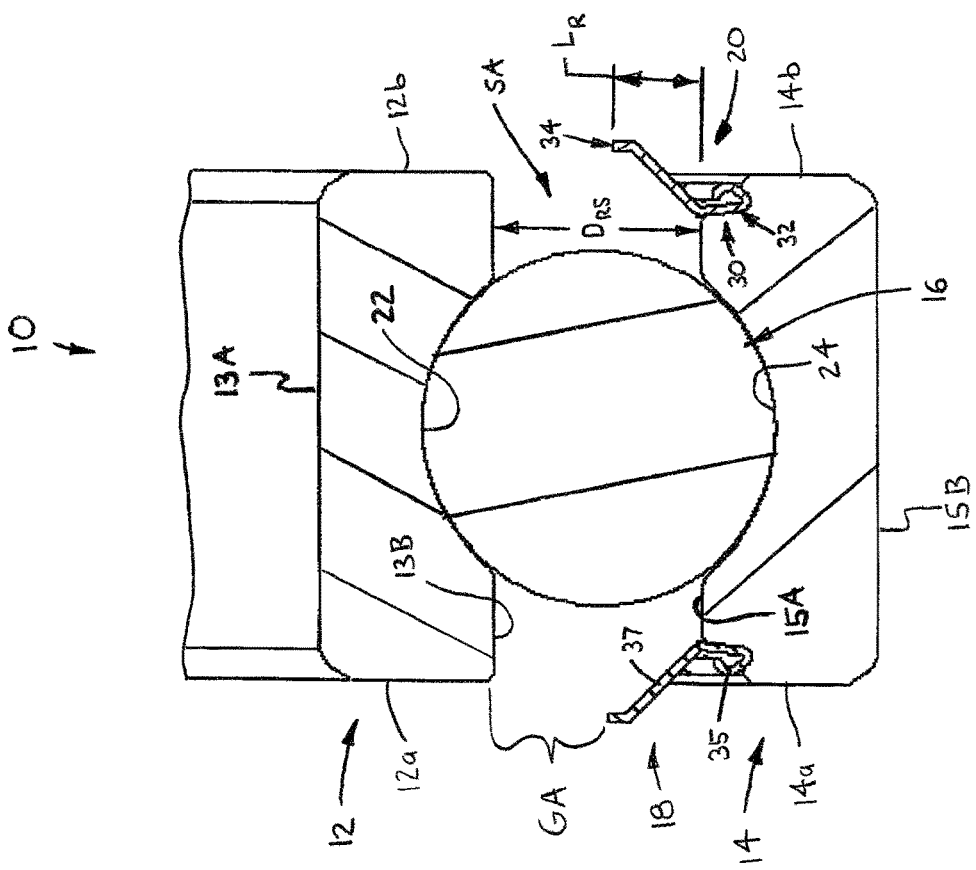
FIG. 15 is yet another a broken-away, axial cross-sectional view of the bearing assembly, showing second construction lubricant retainers having a radial length of about forty percent of the radial spacing distance.

Referring particularly to FIGS. 3 and 10, each one of the first and second lubricant retainers 18, 20 preferably has a plurality of circumferentially spaced, deflectable arcuate engagement segments 31 extending radially outwardly from a remainder of the retainer body 30. Such segments 31 are formed by cutting a plurality of radial slots 33 extending inwardly from the outer edge of each body 30, and then bending or curling each section between adjacent slots 33 to form a generally cylindrical segment which is deflectable with respect to the remainder of the body 30. As such, each segment 31 is configured to releasably engage with a separate one of the first and second annular grooves 40, 42 of the outer ring 14 to releasably secure or attach the retainer 18, 20, respectively, to the outer ring 14. Although such "curled" edge segments 31 are presently preferred to couple the lubricant retainers 18, 20 to with the outer ring 14, the retainers 18, 20 may be attached, releasably, semi-permanently or permanently, to the outer ring 14 in any appropriate manner (e.g., fasteners, adhesives, etc.)

Referring to FIGS. 1-6, in one construction of the first and second retainers 18, 20, each retainer body 30 is formed such that the barrier portion 37 is generally flat and extends substantially radially from the bearing outer ring 14 toward the bearing inner ring 12. As such, each annular gap GA extends substantially axially between the inner edge of each retainer barrier portion 37 and one axial end 12a or 12b of the inner ring 12. Depending on the particular application of the bearing assembly 10, each retainer barrier portion 37 is sized to provide both a desired amount of "reservoir space" between the retainers 18, 20 for stored lubricant and an annular gap GA sized to permit a sufficient flow of lubricant L into the annular space SA from external sources.

Figure 5:
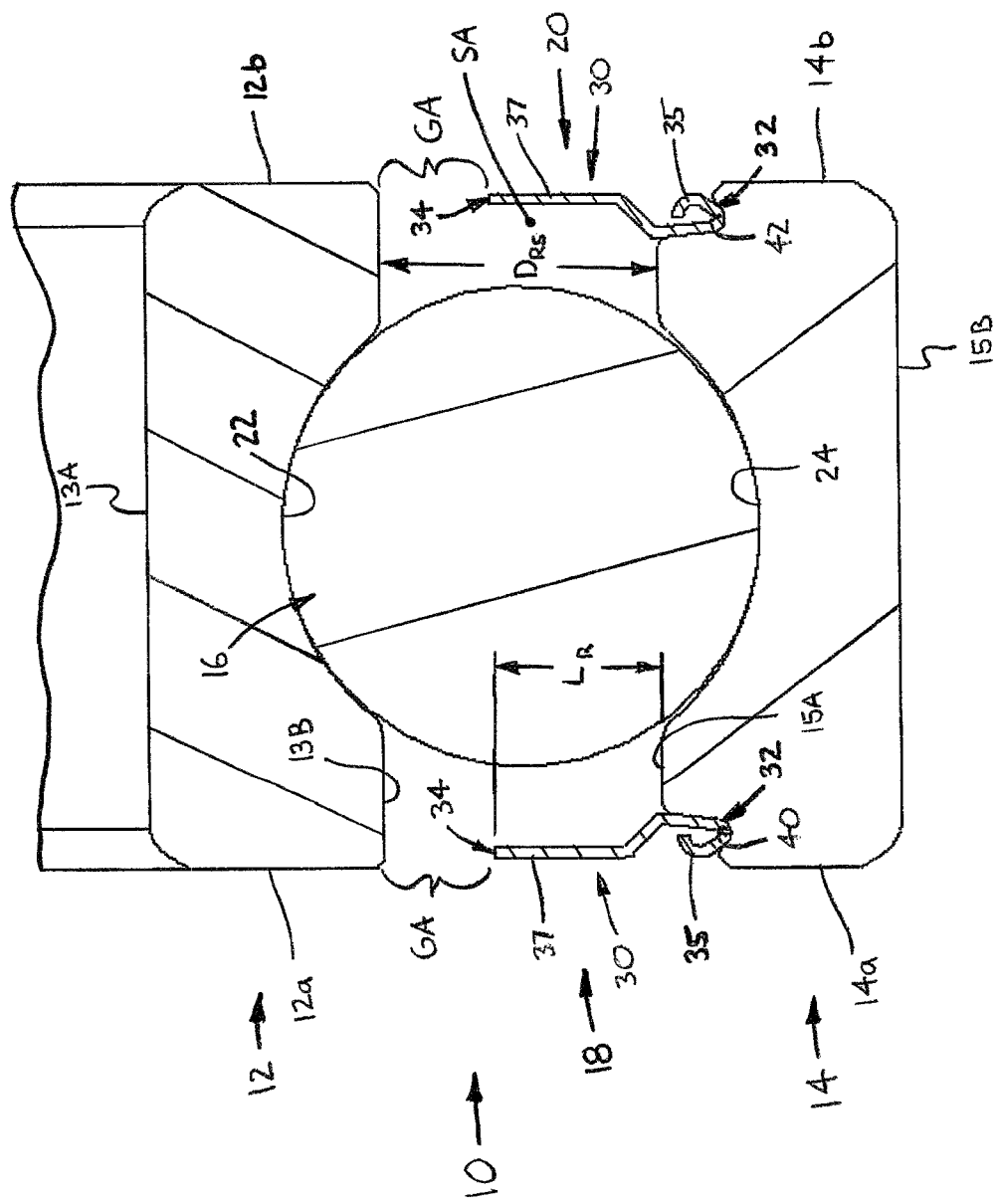
FIG. 5 is another, more simplified view of FIG. 4, shown without lubricant.

More specifically, the barrier portion 37 of each one of the first and second retainers 18, 20 has a radial length $L_R$ defined between the retainer inner radial end 34 and the bearing outer ring 14, as indicated in FIG. 5. The barrier radial length $L_R$ has a value of less than ninety percent (90%) of a value of the radial spacing distance $D_{RS}$ between the two bearing rings 12, 14. Preferably, the value of the radial length $L_R$ of each retainer barrier portion 37 has a value of between about ten percent (10%) of the value of the radial spacing distance $D_{RS}$ and about sixty percent (60%) of the value of the radial spacing distance $D_{RS}$, such variations being depicted in FIGS. 5, 13 and 14. Such a range of lengths $L_R$ of the retainer barrier portions 37 enable both a sufficient quantity of lubricant L to be retained by the retainer lower portions 18L, 20L during a stoppage or idle period of the bearing assembly 10 and a sufficient flow of lubricant into the bearing annular space SA when the bearing assembly 10 is (again) operational.

Referring now to FIGS. 7-12, 15 and 16, in another construction, the annular body 30 of each lubricant retainer 18, 20 is formed such that the barrier portion 37 is generally frustoconical, i.e., generally formed as a frustum of a cone. Specifically, the barrier portion 37 of each one of the first and second retainers 18, 20 extends from the bearing outer ring 14 both radially inwardly toward the bearing inner ring 12 and axially away from the bearing inner ring 12. As such, each barrier portion 37 is generally angled outwardly away from the center (not indicated) of the bearing assembly 10, such that the volume of space between the lubricant retainers 18, 20 (and thus amount of lubricant retainable therebetween), as well as the size of the gap GA, is greater in comparison with corresponding features of a substantially "flat" barrier portion 37 as described above. Specifically, each annular gap GA is defined between the radially inner edge of one retainer barrier portion 37 and the proximal axial end 12a or 12b of the bearing inner ring 12, and due to the angled barrier portions 37, each gap GA has both radial and axial components.

Further, each retainer barrier portion 37 may range in size from relatively short or shallow (e.g., FIG. 15), in which the amount of lubricant retainable is relatively lesser with a proportionate increase in the size of the annular gap GA, to relatively long and deep (e.g., FIGS. 12 and 16) with a greater volume of lubricant L being retainable therein. However, due to the axially-outwardly extending structure of the retainers 18, 20, the annular gap GA provided by each frustoconical barrier portion 37 is relatively large, particularly in comparison with the gaps GA of the flat barrier portions 37, and are present even if the radial length $L_R$ or each barrier portion 37 is greater than the size of the $D_{RS}$ (i.e., the barrier portions 37 overlap the ends 12a, 12b of the inner ring 12).

Referring specifically to FIGS. 17 and 18, an alternative construction of the bearing assembly 10 is shown which includes only a single lubricant retainer 50 which functions to retain lubricant L within the bearing annular space SA in combination with a radial barrier surface 52 provided by a structural component of the machine, device, etc., in which the bearing assembly 10 is incorporated. Specifically, as discussed above, the bearing assembly 10 is preferably mounted within the bore 3 of a radially-outer member 2 such as a housing, a hub, etc., and the barrier surface 52 may be provided by a shoulder 4 (FIG. 17) or another integral portion of the radially-outer member 2 or by a separate component, such as an annular ring 5 (FIG. 18), disposed within the radially-outer member 2. The radial barrier surface 52 is located adjacent to the first axial end 14a of the outer ring 14, extends circumferentially about the central axis Ac and also extends radially inwardly from the inner surface 15A of the outer ring 14 and toward the outer surface 13B of the inner ring 12.

Further, the retainer 50 and the barrier surface 52 are configured to retain a quantity of liquid lubricant L within the bearing annular space SA. That is, lowermost portions $50_L$, $52_L$ of the retainer 50 and the barrier surface 52, respectively, retain the quantity of lubricant L within the bearing annular space SA when both of the inner and outer rings 12, 14 are non-rotatable about the central axis Ac. As with the bearing assembly constructions described above, since any portion of the retainer 50 and the barrier surface 52 may be located at the vertically lowermost position during a stoppage of the bearing assembly 10, the entire circumferential perimeter of the retainer 50 and the barrier surface 52 must be capable of retaining liquid lubricant within the bearing annular space SA.

The single lubricant retainer 50 is preferably formed generally as described above and includes an annular body 30 having an outer radial end 32 coupled with the outer ring 14 and an inner radial end 34 spaced radially outwardly from, and/or axially outwardly from, the inner bearing ring 12 such that an annular gap GA is defined between the inner radial end 34 of the retainer 50 and the bearing inner ring 12. The body 30 of the retainer 50 preferably includes or is formed as a relatively thin, circular plate having a central opening defining the radial inner end 34 of the retainer 50, and has a radially-outer engagement portion 35 configured to connect with the outer ring 14 and a barrier portion 37 configured to retain liquid lubricant L within the bearing inner space SA.

Further, the annular body 30 of the retainer 50 may be formed such that the barrier portion 37 is generally flat and extends substantially radially from the bearing outer ring 14 toward the bearing inner ring 12, as shown in FIG. 17, or may be formed such that the barrier portion 37 is generally frustoconical, i.e., generally formed as a frustum of a cone, as depicted in FIG. 18. Although the first axial end 14a of the outer ring 14 is depicted as the "left" side of the ring 14 and the second axial end 14b of the outer ring 14 is shown as the "right" side of the ring 14 in FIGS. 17 and 18, the barrier surface 52 may be disposed adjacent to the right side of the outer ring 14 and the retainer 50 may be coupled with the left side of the outer ring 14 (i.e., first axial end 14a may be right side and second axial end 14b may be left side).

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A bearing assembly comprising:
   an inner ring having inner and outer circumferential surfaces and opposing axial ends, the outer circumferential surface providing a bearing inner race;
   an outer ring disposed about the inner ring so as to define a bearing annular space, the outer ring having inner and outer circumferential surfaces and opposing, first and second axial ends, the inner circumferential surface providing a bearing outer race spaced radially outwardly from the bearing inner race, one of the bearing inner and outer rings being rotatable with respect to the other one of the bearing inner and outer rings about a central axis;
   a plurality of rolling elements disposed between the inner and outer rings so as to roll simultaneously upon the inner and outer races; and
   first and second lubricant retainers, each one of the first and second retainers including an annular body having an outer radial end coupled with the outer ring and an inner radial end spaced radially outwardly or/and axially outwardly from the inner bearing ring such that an annular gap is defined between the inner radial end of each retainer and the bearing inner ring, the first retainer being disposed at least generally adjacent to the first axial end of the outer ring and the second retainer being disposed at least generally adjacent to the second axial end of the outer ring, the first and second retainers being configured to retain a quantity of liquid lubricant within the bearing annular space;
   wherein each one of the first and second retainers includes a radially-outer engagement portion providing the retainer outer radial end and being configured to couple the retainer with the bearing outer ring and a radially-inner barrier portion providing the retainer inner radial end and being configured to retain liquid within the bearing inner space, the barrier portion of each one of the first and second retainers being generally frustoconical and extending from the bearing outer ring both radially toward the bearing inner ring and axially away from the bearing inner ring.

2. The bearing assembly as recited in claim 1 wherein the first and second lubricant retainers are configured such that lowermost portions of the first and second retainers retain the quantity of lubricant within the bearing annular space when both of the inner and outer rings are non-rotatable about the central axis.

3. The bearing assembly as recited in claim 1 wherein the annular gap is sized to permit lubricant to be directed into the bearing annular space from a source external to the bearing.

4. The bearing assembly as recited in claim 1 wherein each one of the first and second retainers includes a circular plate having a central opening defining the radial inner end of the retainer.

5. The bearing assembly as recited in claim 1 wherein:
   the outer ring has a first annular groove extending radially outwardly from the inner circumferential surface of the outer ring and located adjacent to the first axial end of the outer ring, the outer radial end of the first retainer being disposed within the first annular groove; and
   the outer ring has a second annular groove extending radially outwardly from the inner circumferential surface of the outer ring and located adjacent to the second axial end of the outer ring, the outer radial end of the second lubricant retainer being disposed within the second annular groove.

6. The bearing assembly as recited in claim 5 wherein each one of the first and second lubricant retainers has a plurality of circumferentially spaced, deflectable arcuate engagement sections formed at the outer radial end of each one of the first and second retainers and configured to releasably engage with a separate one of the first and second annular grooves of the outer ring.

7. The bearing assembly as recited in claim 1 wherein:
the bearing outer ring is spaced from the bearing inner ring by a radial spacing distance; and
the barrier portion of each one of the first and second retainers has a radial length between the retainer inner end and the bearing outer ring, the radial length having a value of less than ninety percent of a value of the radial spacing distance.

8. The bearing assembly as recited in claim 7 wherein the value of the radial length of the barrier portion of each one of the first and second retainers has a value of between ten percent (10%) of the value of the radial spacing distance and sixty percent (60%) of the value of the radial spacing distance.

9. The bearing assembly as recited in claim 1 wherein:
the outer ring has a first annular groove extending radially outwardly from the inner circumferential surface of the outer ring and located adjacent to the first axial end of the outer ring, the engagement portion of the first retainer including a plurality of circumferentially spaced, deflectable arcuate engagement sections extending radially outwardly from a remainder of the retainer and configured to releasably engage with the first annular groove; and
the outer ring has a second annular groove extending radially outwardly from the inner circumferential surface of the outer ring and located adjacent to the second axial end of the outer ring, the engagement portion of the second retainer including a plurality of circumferentially spaced, deflectable arcuate engagement sections extending radially outwardly from a remainder of the retainer and configured to releasably engage with the second annular groove.

10. A bearing assembly comprising:
an inner ring having inner and outer circumferential surfaces and opposing axial ends, the outer circumferential surface providing a bearing inner race;
an outer ring disposed about the inner ring so as to define a bearing annular space, the outer ring having inner and outer circumferential surfaces and opposing, first and second axial ends, the inner circumferential surface providing a bearing outer race spaced radially outwardly from the bearing inner race, one of the bearing inner and outer rings being rotatable with respect to the other one of the bearing inner and outer rings about a central axis;
a plurality of rolling elements disposed between the inner and outer rings so as to roll simultaneously upon the inner and outer races; and
first and second lubricant retainers, each one of the first and second retainers including an annular body having an outer radial end coupled with the outer ring and an inner radial end spaced radially outwardly from the inner bearing ring such that an annular gap is defined between the inner radial end of each retainer and the bearing inner ring, the gap being sized to permit lubricant to be directed into the bearing annular space from a source external to the bearing, the first retainer being disposed at least generally adjacent to the first axial end of the outer ring and the second retainer being disposed at least generally adjacent to the second axial end of the outer ring, the first and second lubricant retainers being configured such that lowermost portions of the first and second retainers retain the quantity of lubricant within the bearing annular space when both of the inner and outer rings are non-rotatable about the central axis;
wherein the outer ring has a first annular groove extending radially outwardly from the inner circumferential surface of the outer ring and located adjacent to the first axial end of the outer ring, the outer radial end of the first retainer being disposed within the first annular groove, and a second annular groove extending radially outwardly from the inner circumferential surface of the outer ring and located adjacent to the second axial end of the outer ring, the outer radial end of the second lubricant retainer being disposed within the second annular groove; and
wherein each one of the first and second lubricant retainers has a plurality of circumferentially spaced, deflectable arcuate engagement sections formed at the outer radial end of each one of the first and second retainers and configured to releasably engage with a separate one of the first and second annular grooves of the outer ring.

11. The bearing assembly as recited in claim 10 wherein each one of the first and second retainers includes a circular plate having a central opening defining the radial inner end of the retainer.

12. The bearing assembly as recited in claim 10 wherein each one of the first and second retainers includes retain liquid within the bearing inner space.

13. The bearing assembly as recited in claim 12 wherein the barrier portion of each one of the first and second retainers is generally frustoconical and extends from the bearing outer ring both radially toward the bearing inner ring and axially away from the bearing inner ring.

14. The bearing assembly as recited in claim 12 wherein:
the bearing outer ring is spaced from the bearing inner ring by a radial spacing distance; and
the barrier portion of each one of the first and second retainers is generally flat, extends substantially radially from the bearing outer ring toward the bearing inner ring and has a radial length between the retainer inner end and the bearing outer ring, the radial length having a value of less than ninety percent of a value of the radial spacing distance.

15. A bearing assembly comprising:
an inner ring having inner and outer circumferential surfaces and opposing axial ends, the outer circumferential surface providing a bearing inner race;
an outer ring disposed about the inner ring so as to define a bearing annular space, the outer ring having inner and outer circumferential surfaces and opposing, first and second axial ends, the inner circumferential surface providing a bearing outer race spaced radially outwardly from the bearing inner race, one of the bearing inner and outer rings being rotatable with respect to the other one of the bearing inner and outer rings about a central axis;
a plurality of rolling elements disposed between the inner and outer rings so as to roll simultaneously upon the inner and outer races;
a radial barrier surface located adjacent to the first axial end of the outer ring, extending circumferentially about the central axis and extending radially inwardly from the inner surface of the outer ring and toward the outer surface of the inner ring; and
a lubricant retainer disposed at least generally adjacent to the second axial end of the outer ring, the retainer including an annular body having an outer radial end coupled with the outer ring and an inner radial end spaced radially outwardly or/and axially outwardly from the inner bearing ring such that an annular gap is defined between the inner radial end of the retainer and the bearing inner ring, the retainer and the barrier surface being configured to retain a quantity of liquid lubricant within the bearing annular space.

16. The bearing assembly as recited in claim 15 wherein the barrier surface and the retainer are configured such that lowermost portions of the barrier surface and the retainer retain the quantity of lubricant within the bearing annular space when both of the inner and outer rings are non-rotatable about the central axis.

17. The bearing assembly as recited in claim 15 wherein the annular gap is sized to permit lubricant to be directed into the bearing annular space from a source external to the bearing.

18. The bearing assembly as recited in claim 15 wherein the outer ring is disposed within a bore of a hub or a housing, the barrier surface is provided by a shoulder of the hub or the housing or by an annular body disposed within the bore, and the retainer body is provided by a circular plate having a central opening defining the radial inner end of the retainer.

* * * * *